United States Patent
Damle et al.

(10) Patent No.: US 7,408,939 B1
(45) Date of Patent: Aug. 5, 2008

(54) METHOD AND APPARATUS FOR TRANSPORT OF FRACTIONAL DATASTREAMS OVER FRAME-BASED TRANSPORT SYSTEMS

(75) Inventors: Rajendra R. Damle, Plano, TX (US); Troy D. Robinson, Overland Park, KS (US); Robert K. Butler, McKinney, TX (US); Robert W. Cantwell, Lucas, TX (US); Justin Hunt, Wylie, TX (US); Robert Dittmar, Richardson, TX (US)

(73) Assignee: Ceterus Networks, Inc., Richardson, TX (US)

( * ) Notice: Subject to any disclaimer, the term of this patent is extended or adjusted under 35 U.S.C. 154(b) by 747 days.

(21) Appl. No.: 10/937,628

(22) Filed: Sep. 9, 2004

Related U.S. Application Data (60) Provisional application No. 60/501,351, filed on Sep. 9, 2003.

(51) Int. Cl.
*H04L 12/56* (2006.01)
*H04L 12/28* (2006.01)

(52) U.S. Cl. ............ 370/395.1; 370/252; 370/253; 370/353; 370/395.51; 370/395.52; 370/395.41; 370/395.61; 370/470; 370/471; 370/472; 370/473; 370/474

(58) Field of Classification Search ............ None
See application file for complete search history.

(56) References Cited

U.S. PATENT DOCUMENTS

| | | | |
|---|---|---|---|
| 4,321,703 A | 3/1982 | Schwäertz et al. ............ 370/89 |
| 4,516,240 A | 5/1985 | Kume et al. ................... 370/94 |
| 4,594,708 A | 6/1986 | Servel et al. .................. 370/94 |
| 4,685,105 A | 8/1987 | Shikama et al. ............... 370/89 |
| 4,706,246 A | 11/1987 | Kume .......................... 370/89 |
| 4,763,319 A | 8/1988 | Rozenblit .................... 370/89 |
| 4,764,921 A | 8/1988 | Graves et al. ............ 370/110.1 |
| 4,771,425 A | 9/1988 | Baran et al. ............. 370/110.1 |
| 4,819,226 A | 4/1989 | Beckner et al. ............... 370/55 |
| 4,833,671 A | 5/1989 | Beckner et al. ............... 370/80 |
| 4,833,673 A | 5/1989 | Chao et al. .................... 370/94 |
| 4,855,999 A | 8/1989 | Chao .......................... 370/112 |
| 4,893,306 A | 1/1990 | Chao et al. ................. 370/94.2 |
| 7,006,531 B2* | 2/2006 | Samrao ..................... 370/470 |
| 2004/0028051 A1* | 2/2004 | Etemadi et al. .......... 370/395.1 |

OTHER PUBLICATIONS

R. W. Muise, T. J. Schonfeld and G. H. Zimmerman III, "Experiments in Wideband Packet Technology", Proc. 1986, International Zurich Seminar on Digital Communications, pp. 136-138.

(Continued)

*Primary Examiner*—Raj K Jain
(74) *Attorney, Agent, or Firm*—Campbell Stephenson LLP; Jonathan N. Geld (57) ABSTRACT

A method, system and transport unit to combine and transport multiple variable data rate LAN streams and fixed data rate voice streams through a plurality of transmission links used as a conduit for transmission of data between local area networks are disclosed. Combining both TDM and packetized network traffic into packets for transfer between LANs using a framed protocol for the transfer is further disclosed.

13 Claims, 9 Drawing Sheets

OTHER PUBLICATIONS

W. W. Chu, "A Study of Asynchronous Time Division Multiplexing for Time-Sharing Computer Systems", Proc. AFIPS, vol. 35, pp. 669-678, 1969.

A Thomas, et al., "Asynchronous Time Division Techniques: An Experimental Packet Network Integrating Video Communication", Proc. International Switching Symposium, May 1984, pp. 1-7.

* cited by examiner

METHOD AND APPARATUS FOR TRANSPORT OF FRACTIONAL DATASTREAMS OVER FRAME-BASED TRANSPORT SYSTEMS

CROSS-REFERENCES TO RELATED APPLICATIONS

This invention claims priority from Provisional Patent Application Ser. No. 60/501,351, entitled "METHOD AND APPARATUS FOR TRANSPORT OF FRACTIONAL DATASTREAMS OVER FRAME-BASED TRANSPORT SYSTEMS," filed Sep. 9, 2003, and naming R. Damle, T. Robinson, R. Butler, R. Cantwell, J. Hunt and R. Dittmar as inventors. This provisional patent application has as its assignee Ceterus Networks, the assignee of the present invention. This provisional patent application is incorporated herein by reference in its entirety and for all purposes.

The present invention further includes by reference the following patent application:
1. Provisional Patent Application Ser. No. 60/140,425, entitled "METHOD AND APPARATUS FOR TRANSPORT OF PACKET-BASED DATASTREAMS OVER FRAME-BASED TRANSPORT SYSTEMS", filed Sep. 13, 2002, and naming R. Butler, W. Szeto, R. Cantwell, R. Damle, D. Nag, J. Carrel, T. Robinson, T. Lunsford, R. Raja, S. Amble and S. Deans as inventors.

The foregoing-referenced patent application is hereby incorporated by reference herein, in its entirety and for all purposes.

FIELD OF THE INVENTION

This invention relates to the field of information networks, and more particularly relates to a method and system for conveying both TDM and packetized data over a frame-based network.

BACKGROUND OF THE INVENTION

A small- to medium-sized enterprise typically needs two types of connections and services from a network service provider. First is voice or telephone service and second is data service, which is most commonly internet connectivity. Data service typically has a high-bandwidth requirement (in the Mb/s range) and demand typically grows rapidly as the business grows. While voice service demands typically do not grow as quickly as those of data service, voice service requires little-to-no delay in transmission of signals.

Over 90% of the buildings that house a typical small- to medium-sized enterprise are physically connected to a network provider's central office through a bundle of multiple twisted copper pairs. Thus, network service providers need to leverage the copper access by utilizing all the available copper pairs to the fullest in order to economically provide bandwidth for growing data service demands.

Today, there are two types of transmission technologies and protocols widely used to transmit a bit stream over a copper pair: T-1 and DSL (Digital Subscriber Loop). T-1 is a constant 1.544 Mbps stream developed to transport 24 digitized voice channels (DS0s). DSL encoding is a variable data rate transmission technology that optimizes a line's data rate by taking into account the distance the signal is to be transmitted and the signal-to-noise ratio at the receive end.

An expanded bandwidth can be realized if multiple copper pairs are used to transmit data. Such an arrangement can be realized through the formation of a multiple T-1 or DSL connection pipe between a transmit and receive node. Therefore, there is a need for a versatile bonding technology that can form a large bandwidth pipe using multiple transmission lines and capable of reliably transporting multiple high data rate data traffic as well as voice traffic through the pipe.

SUMMARY OF THE INVENTION

Methods, systems and apparatus have been discovered to transport multiple variable data rate LAN streams and fixed data rate voice streams through a plurality of transmission links used as a conduit for transmission of data between local area networks. Both TDM and packetized network traffic are combined into packets for transfer between LANs. The incoming packetized data streams are distributed among the network links, which use a framed protocol.

Accordingly, one aspect of the present invention provides a method for forming a packet called a payload data unit (PDU) from a plurality of input data streams and forming an output frame using the payload data unit. The input data streams can be one or more of TDM data streams and packetized data streams.

Another aspect of the present invention provides a transport unit that comprises a PDU formation unit configured to form a PDU, and a frame formation unit coupled to the PDU formation unit. A PDU formed by the PDU formation unit comprises TDM data from a TDM datastream and packetized data from a packetized datastream.

A further aspect of the present invention provides a system that comprises a first transport unit coupled to a first network, a second transport unit coupled to a second network, and a transmission link coupled between the first and second transport units. The transmission link is configured to convey a data frame between the first and second transport units, and the data frame is made up of both TDM data and packetized data.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and numerous objects, features, and advantages made apparent to those skilled in the art by referencing the accompanying drawings.

The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Introduction

The present invention provides for the conveyance of data streams in a frame-based communications environment by first translating TDM and packetized data streams into an intermediate format (payload data units, or PDUs), and then aggregating the PDUs thus formed into frame-based data streams.

A universal transport platform (UTP) is defined that enables multiple data streams to be simultaneously transported across multiple long distance transmission links with inherent protection. A UTP according to the present invention is indifferent to all existing and future framing protocols and data rates. This indifference enables a universal transport system (UTS, or transport unit) according to the present invention to be built that is specific to access, metro or core network applications.

An Example Network Element Architecture

Figure 1:
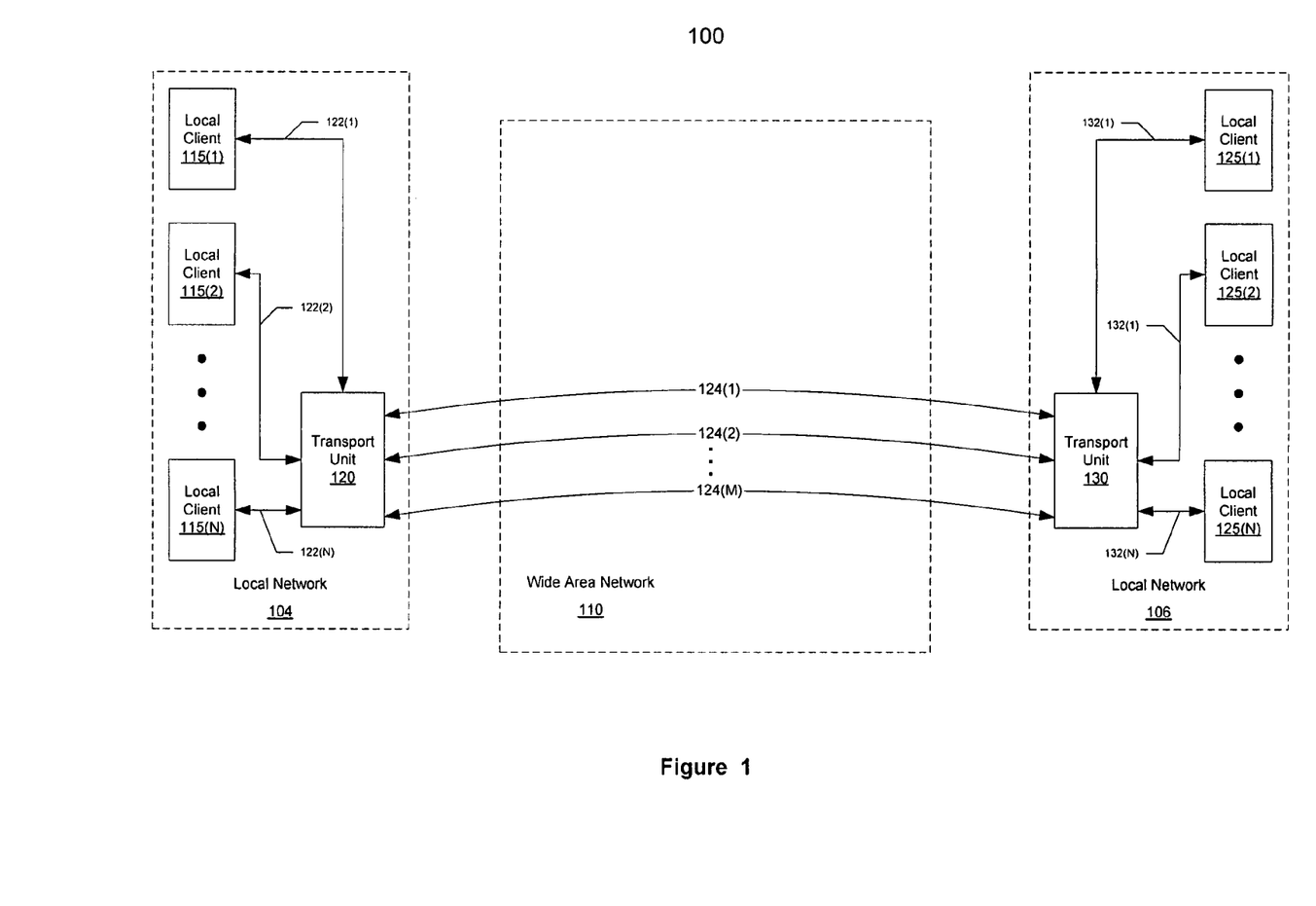
FIG. 1 is a block diagram illustrating a network employing an architecture supported by embodiments of the present invention.

FIG. 1 is a block diagram illustrating a network 100 that employs an architecture supported by embodiments of the present invention. Network 100 includes local networks 104 and 106. Local networks 104 and 106 communicate with one another via a core network 110. Local network 104 includes a number of local clients (depicted as local clients 115(N)), which are coupled to a transport unit 120 via communication lines 122(1)-(N). In turn, transport unit 120 is coupled to core network 110 by communication lines 124(1)-(M). Communication lines 122(1)-(N) can carry data in packet format (i.e., Ethernet) or as streams of data (i.e., TDM or T1/E1). In contrast, using such an embodiment, data carried by communication lines 124(1)-(M) are transported using a frame-based protocol (i.e., a protocol in which the data being transported is loaded into frames). Such a frame-based protocol is described in U.S. patent application Ser. No. 10/086,273, entitled "FRAME STRUCTURE AND METHOD FOR WAVELENGTH CONCATENATED CHANNEL FRAMING", filed Feb. 20, 2002, and naming R. Damle as inventor, which is hereby incorporated by reference herein.

Similarly, local network 106 includes a number of local clients (depicted as local clients 125(1)-(N)) which are coupled to a transport unit 130 via a number of communication lines (depicted as communication lines 132(1)-(N)). Also in a manner similar to that previously discussed, transport unit 130 is coupled to core network 110 via a number of communication lines 124(1)-(M). As before, communication lines 132(1)-(N) can carry data in a packetized format or as streams of data, while communication lines 124(1)-(M) carry data in a frame-based format. Embodiments of transport units 120 and 130 are described in U.S. patent application Ser. No. 10/074,264, entitled "TRANSPORT OF HIGH-BANDWIDTH DATASTREAMS OVER A NETWORK", filed Feb. 12, 2002, and naming Robert K. Butler, William C. Szeto, H. Michael Zadikian, Rajendra R. Damle and Young Lee as inventors, and U.S. patent application Ser. No. 10/403,840, entitled "METHOD AND SYSTEM FOR TRANSPORT OF PACKET-BASED DATASTREAMS OVER FRAME-BASED TRANSPORT SYSTEMS EMPLOYING PHYSICALLY DIVERSE TRANSMISSION CHANNELS", filed Mar. 31, 2003, and naming R. Butler, W. Szeto, R. Cantwell, R. Damle and D. Nag as inventors, which are hereby incorporated by reference herein.

Providing communications between local networks 104 and 106, wide area network 110 supports such communications via a number of communication links 124(1)-(M). As will be apparent to one of skill in the art, wide area network 110 can be configured in any of a number of topologies, and employ any one of a number of protocols for transferring the frame-based data received from local networks 104 and 106 to one another. In the topology depicted in FIG. 1, communication links 124(1)-(M) can be implemented, for example, using T-1 protocol.

It will be noted that the variable identifier "N" is used (as are the variable identifiers "M", "J", "K" and so on) in several instances in the figures described herein to more simply designate the final element of a series of related or similar elements. The repeated use of such variable identifiers is not meant to necessarily imply a correlation between the sizes of such series of elements, although such correlation may exist. The use of such variable identifiers does not require that each series of elements has the same number of elements as another series delimited by the same variable identifier. Rather, in each instance of use, the variable identified by "N" (or any other such identifier) may hold the same or a different value than other instances of the same variable identifier.

Moreover, regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing describes an embodiment wherein the different components are contained within different other components (e.g., the various elements shown as components of network 100). It is to be understood that is merely an example, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

An Example Network Element

Figure 2A:
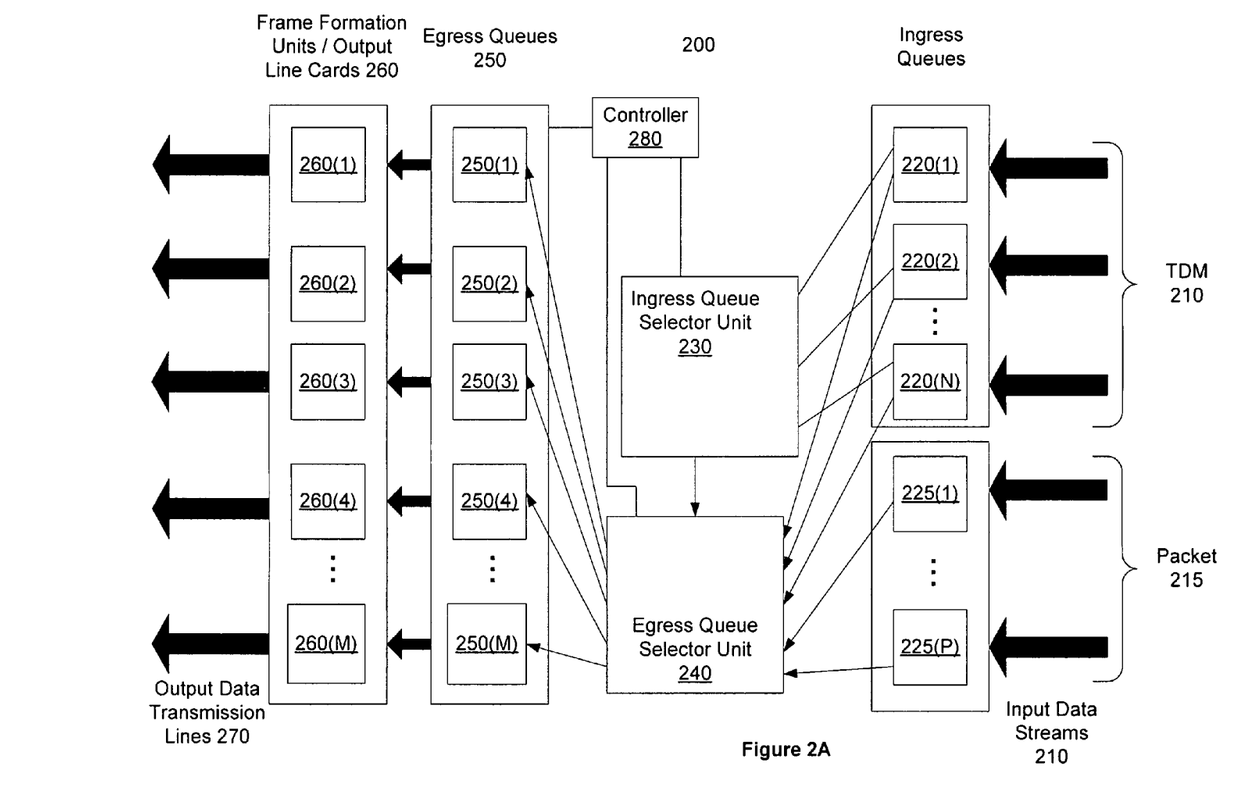
FIG. 2A is a block diagram illustrating control flow of a transmit module of a transport unit according to the present invention.

FIG. 2 is a block diagram illustrating control-level flow of the major components of the transmit module of a transport unit such as transport units 120 and 130, and depicted in FIG. 2 as a transport unit 200. Transport unit 200 includes, generally, a set of ingress queues 220 and 225 to receive data from input data streams 210 and 215, an ingress queue selector unit 230, an egress queue selector unit 240, a set of egress queues 250, and a set of frame formation units 260, that form frames to be transmitted along corresponding output data transmission lines 270.

Input data streams 210 and 215 represent data that is received from clients on a local area network. Data from a local area network can be in a variety of protocols, including, but not limited to, packet-based protocols (Ethernet) (215) and frame-based protocols (T1 or E1) (210). In some embodiments, a number of ingress queues 220 and 225 corresponds to a number of clients, although this need not be the case. Each ingress queue is configured to contain a chosen amount of data from a corresponding input datastream, while the ingress queue awaits processing by an ingress queue selector unit 230. Each ingress queue can additionally have a corresponding priority associated with the ingress queue, depending upon various parameters, including quality of service.

Figure 3A:
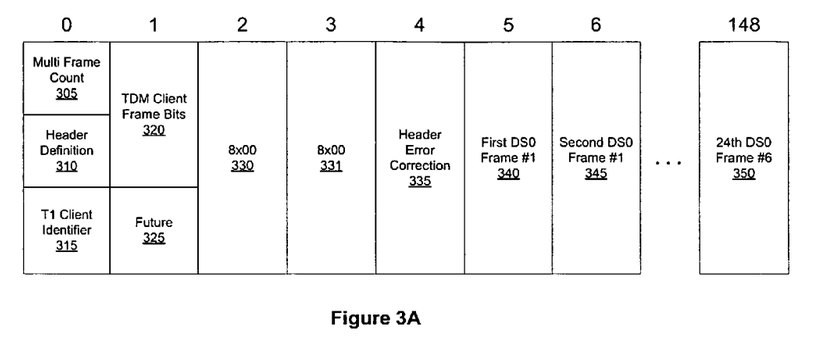
FIGS. 3A and 3B illustrate formats of TDM PDUs generated in accord with one embodiment of the present invention.
Figure 3B:
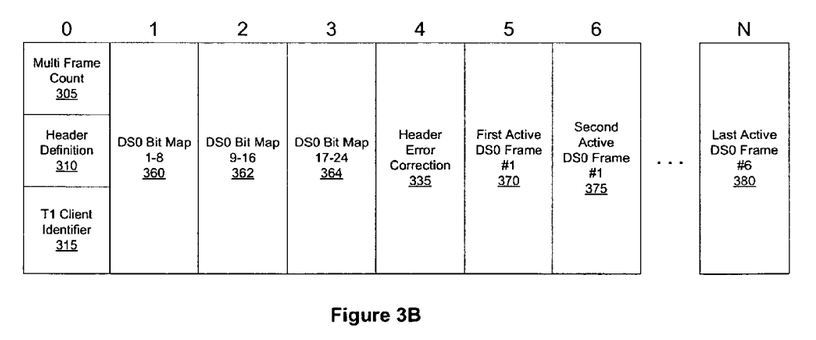

As data is queued in ingress queues 220 and 225, ingress queue selector unit 230 selects queues that are ready for further processing. In one embodiment, ingress queue selector unit selects queues on the basis of a strict-priority round-robin technique (discussed below). The ingress queue selector unit selects ingress queues in a manner designed to minimize delay in processing incoming data while ensuring that data is prioritized appropriately. The ingress queue selector unit can also construct packetized data from the data received from TDM ingress queues 220 (discussed more fully below). Such a constructed packet of TDM data is a TDM payload data unit (TDM PDU). Embodiments of TDM PDUs for use in the present invention are illustrated in FIGS. 3A and 3B (discussed more fully below). An ingress queue selector unit subsequently passes information related to selected ingress queues and TDM PDUs to an egress queue selector unit 240, when the egress selector unit is ready to process the outgoing data.

The role of egress queue selector unit 240 is to fill egress queues 250(1)-250(M) as each becomes available, and to provide an appropriate header for the data in each egress queue. Egress queue selector 240 unit monitors the availability of egress queues 250(1)-250(M) based on a bitmap received from a receiving transport unit (i.e., 130) and chooses among the available egress queues. In one embodiment, the manner of selection is a strict round-robin technique. Upon selection of an egress queue, egress queue selector unit 240 can process a data stream selected by ingress queue selector unit 230, and form appropriate overhead information. The egress queue selector unit can also determine whether a selected egress queue will have space available after insertion of TDM PDUs. If so, the egress queue selector unit can then select a packetized data ingress queue and transfer packets from that packetized data ingress queue to fill the available space in the selected egress queue.

Figure 4:
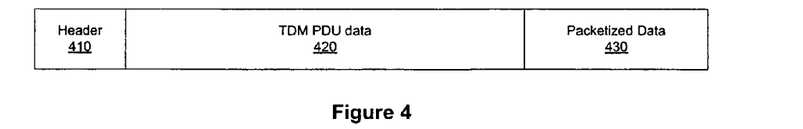
FIG. 4 illustrates an example of the data content of an egress queue in accord with one embodiment of the present invention.

FIG. 4 illustrates an example of the data content of an egress queue after data has been transferred to an egress queue by the egress queue selector unit. Data and header information in an egress queue is a UTP payload data unit (UTP PDU). After filling a selected egress queue, egress queue selector unit 240 then selects a next appropriate available egress queue based upon the selection scheme.

As stated above, the TDM PDU and the data presented to the egress queues can be in the form of variable size packets. There is a likelihood that a TDM PDU's boundary may not coincide with the boundary of a UTP PDU. In that case, the TDM PDU will be split between the UTP PDU currently being formed, up to that UTP PDU's maximum size, and the next UTP PDU to be formed in the next available egress queue. That is, a TDM PDU split among UTP PDUs will be split among consecutively formed UTP PDUs.

In the present invention, the individual output data transmission lines operate using a frame-based protocol, such as T-1 or DSL.

Figure 5A:
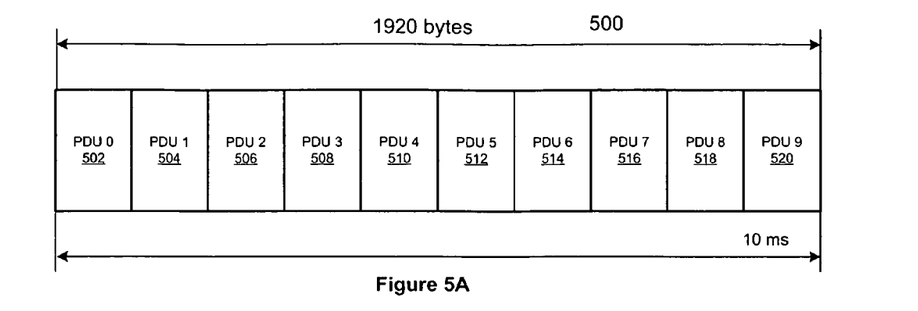
FIG. 5A illustrates one embodiment of a format of a frame for use with the present invention.
Figure 5B:
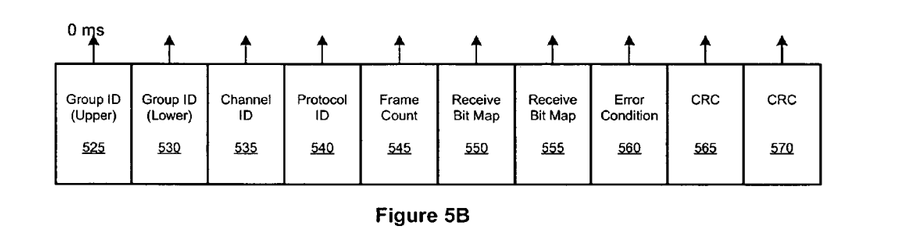
FIG. 5B illustrates a distribution of frame overhead in accord with one embodiment of the present invention.

FIG. 5A illustrates one embodiment of a format of a T-1 frame for use with the present invention. The frame payload size is 1920 bytes (10 ms of data at a T-1 data rate). In FIG. 5A, frame payload contains ten UTP PDUs. In the present invention, a number of UTP PDUs inserted in each frame is constant. Frame overhead is divided among the PDUs (i.e., four bits per PDU) as shown in FIG. 5B.

Once an egress queue has more than one UTP PDU, a UTP PDU is transferred to a frame formation unit corresponding to an egress queue (i.e., egress queue 250(1) transfers data to frame formation unit 260(1)). Each frame is then populated by a set number of UTP PDUs (i.e., ten). Once the set number of UTP PDUs has been transferred to a particular frame formation unit, a frame is formed and then sent out of an appropriate output line card and transmitted to a receiving transport unit (i.e., transport unit 130).

Figure 2B:
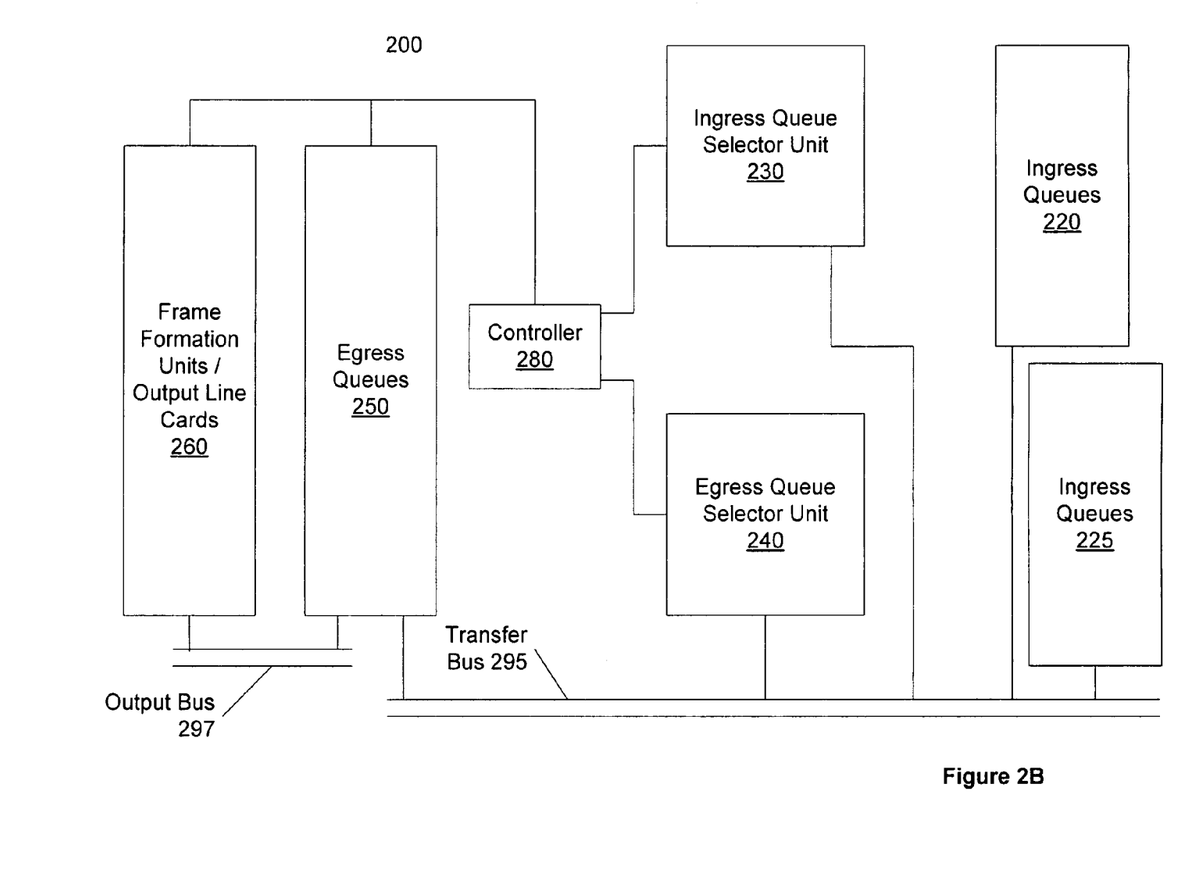
FIG. 2B is a block diagram illustrating data flow of a transmit module of a transport unit according to the present invention.

FIG. 2B depicts data connections within transport unit 200 according to one embodiment of the present invention. A transfer bus 295 connects ingress queues 220 and 225, ingress queue selector unit 230, egress queue selector unit 240 and egress queues 250 to permit data flow between them. As data enters the ingress queues 220 and 225, ingress queue selector unit 230 communicates with the ingress queues through the bus and selects from those queues as discussed above. The ingress queue selector unit passes information related to the selected ingress queues through the bus to egress queue selector unit 240.

As discussed above, the egress queue selector unit selects an available egress queue in 250. Egress queue selector unit 240 then forms an appropriate header for the UTP PDU, sends that header over transfer bus 295 to the selected egress queue, and also causes the selected ingress queue(s) to transfer data to the selected egress queue over transfer bus 295. Once UTP PDUs are formed, they can be sent to a corresponding frame formation unit 260 over output bus 297 for frame formation and transmittal over a corresponding output data transmission line.

The above description is intended as an example of the connections between the various components of a transport unit, but is not intended to limit the types of connections. For example, each egress queue in 250 could be directly connected to a corresponding frame formation unit, rather than being connected through a bus.

Strict-Priority Round-Robin Scheduling

In one embodiment, the ingress queue selector unit implements a strict-priority round-robin (SPRR) technique for data collection and distribution. The purpose of ingress queue selector unit 230 is to collect data from each TDM input (i.e., ingress queues 220(1)-(N)) in strict round-robin priority, starting with ingress queues having the highest priority among each group of ingress queues, form a TDM PDU from the data in the selected TDM ingress queue, and pass data related to the TDM PDU to the egress queue selector unit.

Ingress queue module 220 receives data from TDM ingress queue data streams 210 at data rates that are individually set per input line. This data is buffered in ingress queues 220(1)-(N). Data is collected from ingress queues 220(1)-(N) in strict round-robin fashion starting with the highest priority ones of ingress queues 220(1)-(N). The last one of ingress queues 220(1)-(N) served in each priority is saved at every output time. Then, at the next output time, data collection is started from where the ingress queue selector left off during the last collection event. Thus, all TDM inputs are equally served at all times in all priorities.

Ingress queue module 225 receives data from packet-based ingress queue data streams 215 (i.e., Ethernet data streams). As a group, this packetized traffic has a lower priority than does TDM traffic served by ingress queue module 220. Within this group, the packetized data can have set priorities so that certain clients are selected with preference over others according to an SPRR methodology. Due to the lower priority of packetized traffic as compared with TDM traffic, the packetized data clients' traffic serves as a filler for UTP PDU formation; i.e., filling space remaining after insertion of higher priority TDM traffic (TDM PDUs) into a UTP PDU. Thus, in one embodiment it is egress queue selector unit 240 that selects packetized data clients to fill the UTP PDU, after egress queue selector unit 240 has information from ingress queue selector unit 230 as to the amount of TDM data to be inserted into a UTP PDU.

Egress queue selector 240 distributes collected input data to active egress queues 250(1)-(M). The egress queue selector unit selects egress queues using a strict round-robin scheduling technique. An egress queue is indicated as active by a sub-channel bitmap received from the far-end receive side of the corresponding output data transmission line. If the amount of data to be sent is less than the number of active sub-channels, null data is sent to the remaining channels.

Input to Output Process Flow

Figure 6A:
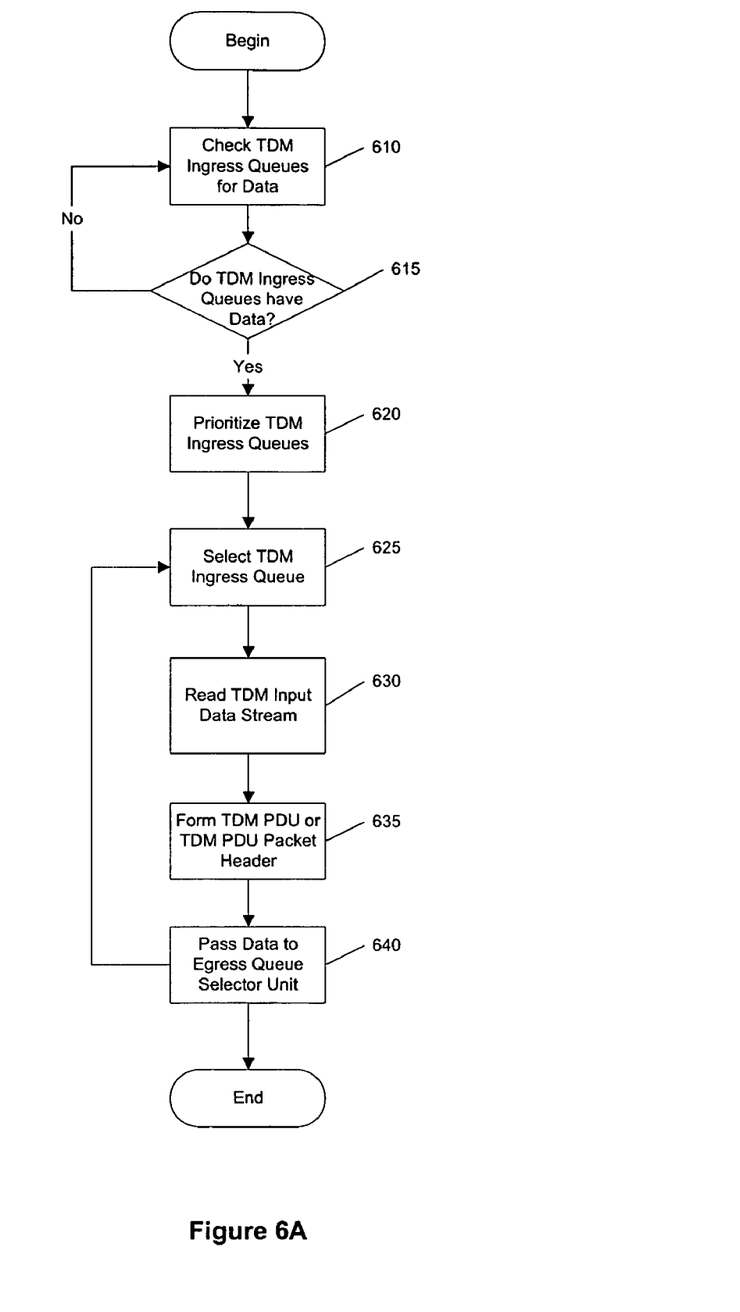
FIGS. 6A and 6B depict flow diagrams illustrating processes according to one embodiment of the present invention.
Figure 6B:
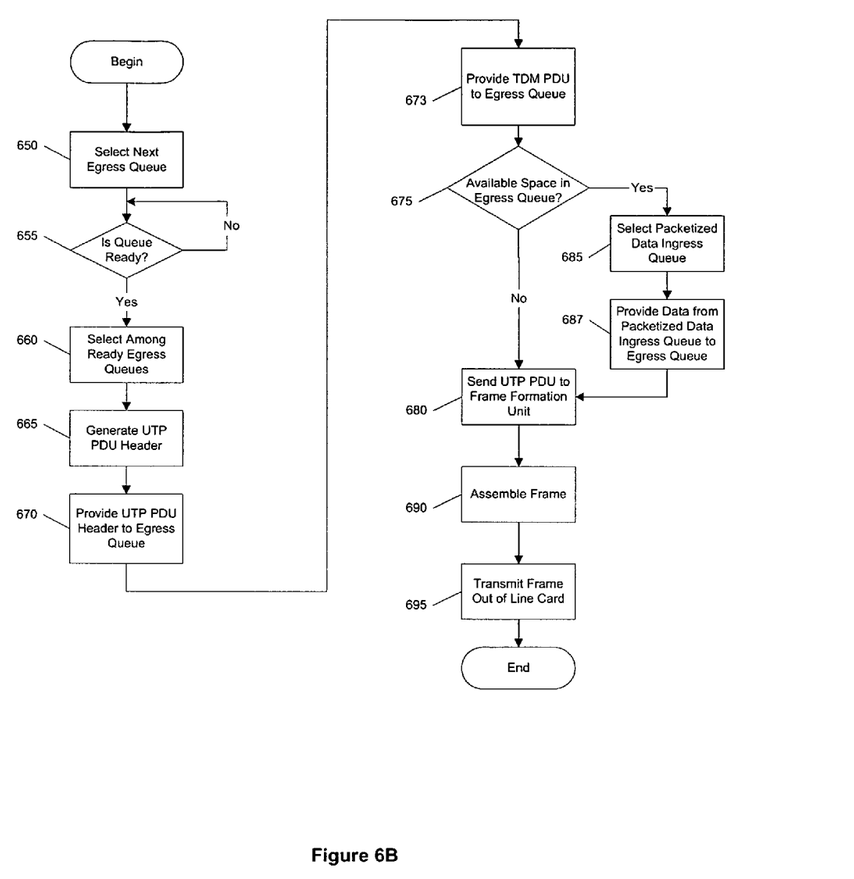

FIGS. 6A and 6B depict flow diagrams illustrating processes according to one embodiment of the present invention. FIG. 6A represents a process occurring within ingress queue selector unit 230. FIG. 6B represents a process occurring within egress queue selector unit 240, as well as subsequent egress queues 250 and frame formation units 260.

In FIG. 6A, an ingress queue selector unit checks TDM ingress queues for data (610) and, if there is no data, engages in a loop until data is detected in the ingress queues (615). Once TDM ingress queues begin to fill, an ingress queue selector unit then organizes ingress queues on a priority basis (620). Priority can be determined based on considerations such as data rate provisioned for an incoming data stream and other quality of service required by a data stream. Such prioritizing of the lines can be done, for example, during startup configuration of a transport unit.

Once queues are prioritized, the ingress queue selector unit then selects a TDM ingress queue for processing on a strict-priority round-robin basis (625). The TDM data in the TDM ingress queue is then read (630) and a TDM PDU can be formed, wherein the TDM data is allocated to a payload and a header is generated by the ingress queue selector unit (635). The TDM PDU packet can be provided to an egress queue selector unit (640). Alternatively, the data itself may remain in the same memory location (i.e., the ingress queue), while the ingress queue selector unit generates a header for the TDM PDU and sends the header along with a pointer to the memory location to the egress queue selector unit.

Once the TDM PDU (or a header and a pointer thereto) is passed along to the egress queue selector unit, the ingress queue selector unit then proceeds to select the next ingress queue based upon a selection algorithm (e.g., strict-priority round-robin).

An egress queue selector unit may perform its operations at the same time that the ingress queue selector unit is processing. FIG. 6B demonstrates one embodiment of such a process. The egress queue selector unit monitors egress queues (650) and determines whether a particular egress queue is ready to receive data. Once an egress queue is ready, the egress queue selector unit selects among available egress queues using a selection method (e.g., strict round-robin) (660).

The egress queue selector unit then generates a UTP PDU header to be inserted into space reserved at the beginning of the selected egress queue (665). The information in the UTP PDU header can be based in part upon the information received from the ingress queue selector unit. The UTP PDU header is then provided to the selected egress queue (670). The egress queue selector unit can then begin providing data (i.e., TDM PDUs) received from the ingress queue selector unit (673). In the alternative embodiment discussed above, the egress queue selector unit can transfer generated TDM PDU packet headers and data from the memory location pointed to by the ingress queue selector unit to an egress queue memory location.

The egress queue selector unit can then determine if there is available space in the egress queue (675). If so, the egress queue selector unit can also fill available space in the egress queues with data from packetized data ingress queues by selecting a packetized data ingress queue, using a selection methodology such as strict-priority round robin (685). It should be noted that in the event that there is no incoming TDM data, UTP PDUs can be comprised completely of data from the packetized data ingress queues.

At this point, information in a full egress queue (including header information) constitutes a UTP PDU. It should be noted that while this example has described the formation of a UTP PDU in a selected egress queue, a UTP PDU need not be formed in the egress queue. The egress queue selector unit can be configured with a UTP PDU memory so that UTP PDUs are formed within the egress queue selector unit itself. Alternatively, a UTP PDU formation memory can be provided outside of both the egress queue and the egress queue selector unit, wherein the data comprising a UTP PDU can be collated prior to sending to the selected egress queue.

After a UTP PDU is formed, the UTP PDU is sent to a frame formation unit (680). A frame formation unit then builds an appropriate outgoing frame. In certain embodiments, a frame formation unit builds a frame whose payload contains a set number of UTP PDUs. In one embodiment of the invention, ten UTP PDUs are contained within each outgoing frame. A frame formation unit continues to add UTP PDUs to the payload of a frame until that frame is full. Once a frame payload is full, a frame formation unit does the final assembly of a frame by including appropriate header and trailer information (690).

After a frame has been assembled, a frame formation unit sends the frame out of the associated line card (695). A line card provides a physical interface for transmission of framed data along a network between a local transport unit and a remote transport unit. It should be noted that outgoing line cards can be configured to produce data streams using a variety of frame-based protocols, and can be configured to support multiple frame-based protocols and varying bit-rates.

As noted, FIGS. 6A and 6B depict flow diagrams illustrating a process according to one embodiment of the present invention, as do other figures described herein. Operations discussed herein may consist of directly entered commands by a computer system user or by steps executed by software modules or the like, but the preferred embodiment includes steps executed by application specific hardware modules. The functionality of steps referred to herein may correspond to the functionality of modules or portions of modules.

The operations referred to herein may be modules or portions of modules (e.g., software, firmware or hardware modules). For example, although the described embodiment includes software modules and/or includes manually entered user commands, the various example modules may be application specific hardware modules. The software modules discussed herein may include script, batch or other executable files, or combinations and/or portions of such files. The software modules may include a computer program or subroutines thereof encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, those skilled in the art will recognize that the operations described in example embodiment are for illustration only. Operations may be combined or the functionality of the operations may be distributed in additional operations in accordance with the invention.

Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the blocks of the flow diagram may be executed by a module (e.g., a software module) or a portion of a module or a computer system user. Thus, the above described method, the operations thereof and modules therefore may be executed on a computer system configured to execute the operations of the method and/or may be executed from computer-readable media. The method may be embodied in a machine-readable and/or computer-readable medium for configuring a computer system to execute the method. Thus, the software modules may be stored within and/or transmitted to a computer system memory to configure the computer system to perform the functions of the module.

Such a computer system normally processes information according to a program (a list of internally stored instructions such as a particular application program and/or an operating system) and produces resultant output information via I/O devices. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Such a computer system typically includes multiple computer processes executing "concurrently." Often, a computer system includes a single processing unit which is capable of supporting many active processes alternately. Although multiple processes may appear to be executing concurrently, at any given point in time only one process is actually executed by the single processing unit. By rapidly changing the process executing, a computer system gives the appearance of concurrent process execution. The ability of a computer system to multiplex the computer system's resources among multiple processes in various stages of execution is called multitasking. Systems with multiple processing units, which by definition can support true concurrent processing, are called multiprocessing systems. Active processes are often referred to as executing concurrently when such processes are executed in a multitasking and/or a multiprocessing environment.

The software modules described herein may be received by such a computer system, for example, from computer readable media. The computer readable media may be permanently, removably or remotely coupled to the computer system. The computer readable media may non-exclusively include, for example, any number of the following: magnetic storage media including disk and tape storage media. optical storage media such as compact disk media (e.g., CD-ROM, CD-R, etc.) and digital video disk storage media. nonvolatile memory storage memory including semiconductor-based memory units such as FLASH memory, EEPROM, EPROM, ROM or application specific integrated circuits. volatile storage media including registers, buffers or caches, main memory, RAM, and the like. and data transmission media including computer network, point-to-point telecommunication, and carrier wave transmission media. In a UNIX-based embodiment, the software modules may be embodied in a file which may be a device, a terminal, a local or remote file, a socket, a network connection, a signal, or other expedient of communication or state change. Other new and various types of computer-readable media may be used to store and/or transmit the software modules discussed herein.

Mapping of PDUs into an Outgoing Frame

In the present invention, UTP PDUs formed in egress queues are inserted or mapped into frames that are then sent between the local transport unit and the remote transport unit. The size of each UTP PDU is set such that its duration is constant. That duration is an even multiple of the payload length of the output frame. For example, for an outgoing frame of 1920 bytes containing ten UTP PDUs, each UTP PDU contains 192 bytes of data. Or in other words, for a 10 ms outgoing frame, each UTP PDU is 1 ms in duration.

FIG. 5A shows an example of UTP PDUs (522, 523, 524, 525, 526 and 527) inserted into a payload of an outgoing frame.

FIG. 5B shows an example of how frame overhead can be divided among the PDUs inserted in the frame. In this embodiment, frame overhead can be four bits of data in included in each UTP PDU (label 734 in FIG. 7). PDU 0 and PDU 1 include an upper (525) and lower (530) portion of a user programmable group identifier for a point-to-point link. PDU 2 includes a channel identifier (535), which identifies the channels (output data transmission lines) in which the PDUs are distributed across line bandwidth. PDU 3 includes a protocol identifier (540) to provide multiple or updated protocol interoperation capability. PDU 4 includes a frame counter (545) for use with higher rate line interfaces or for skew compensation greater than 10 PDUs worth in this particular example. PDU 5 and PDU 6 include a receive bit map (550, 555) that identifies the local receive status of the line ports 1-8. PDU 7 includes error condition overhead (560); such error condition overhead may, for example, be defined: (1) bit 3: channel identification error (invalid channel identifier received), (2) bit 2: excess skew error (channel is out of skew group), (3) bit 1: loss of PDU sync (PDU synchronization lost). PDU 8 and PDU 9 include cyclic redundancy check calculations over the frame overhead (565, 570).

Format of a UTP PDU

Figure 7:
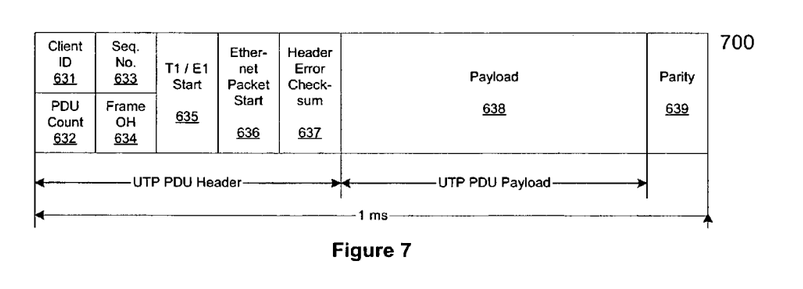
FIG. 7 illustrates a UTP payload data unit according to one embodiment of the present invention.

As shown in FIG. 7, a UTP PDU header, as generated by egress queue selector unit 240, typically contains information related to the content of the PDU payload 738. In one embodiment, such header information can include identification of an input port where data was received 731, a sequence of a UTP PDU 733 for possible skew compensation, frame overhead 734, a number of TDM PDUs within a payload area of a UTP PDU 732, starting pointers of TDM PDUs within a UTP PDU payload 735, a number of Ethernet payload bytes within a payload of a UTP PDU 736, and header error correction information 737. There can also be appended parity information 739.

As shown in FIG. 4, the data within a UTP PDU payload can be divided between TDM PDUs and data from packetized network clients. As discussed above, an amount of packetized data 430 within a UTP PDU is dependant upon an availability of space within an egress queue after TDM PDU data has been designated for that egress queue. A UTP PDU payload can be comprised entirely of TDM PDU data, entirely of packetized network client data, or a combination of the two.

Format of a TDM PDU

FIGS. 3A and 3B illustrate formats of TDM PDUs generated in accord with one embodiment of the present invention. A TDM PDU is used to contain within a packet all or some of the DSOs present in a TDM frame (i.e., T-1 or E1), in order for the TDM data to be combinable with data from network clients that is in packetized form (i.e., Ethernet).

A TDM PDU can carry either fractional TDM data, where inactive DSOs are removed, or intact TDM data, where an entire TDM frame (i.e., a 193 bit T-1 frame) is carried.

FIG. 3A shows one embodiment of an intact frame TDM PDU (300) (i.e., a "clear channel" TDM PDU) for T-1 client data. Such a TDM PDU consists of all DSOs from six frames. A TDM PDU header can include fields such as: (1) multiframe count (305)—identifies frame signaling bits; (2) header definition (310)—defines the function of the TDM PDU (i.e., intact TDM PDU, fractional TDM PDU, periodic trunk conditioning maintenance TDM PDU to update far end conditioning register, intact TDM PDU with client side receive failure); (3) T1 Client identifier—identifies an ingress queue port; (4) Header Error Correction (335)—remainder of the CRC calculation over the TDM PDU header. An intact TDM PDU will also include all of the data found in the incoming TDM frame (illustrated in the figure for incoming T-1 client data DSOs (340, 345, 350)).

FIG. 3B shows one embodiment of a fractional data TDM PDU (355). This header of a fractional data TDM PDU contains many of the same fields as that of a intact frame TDM PDU (300), except that it includes fields containing a bit map of those DSOs included in the payload of the fractional data TDM PDU (360, 362, 364). The payload of a fractional data TDM PDU then includes only active DSOs in the TDM ingress queues (370, 375, 380).

State Machine Embodiment of Transmit Module

Figure 8:
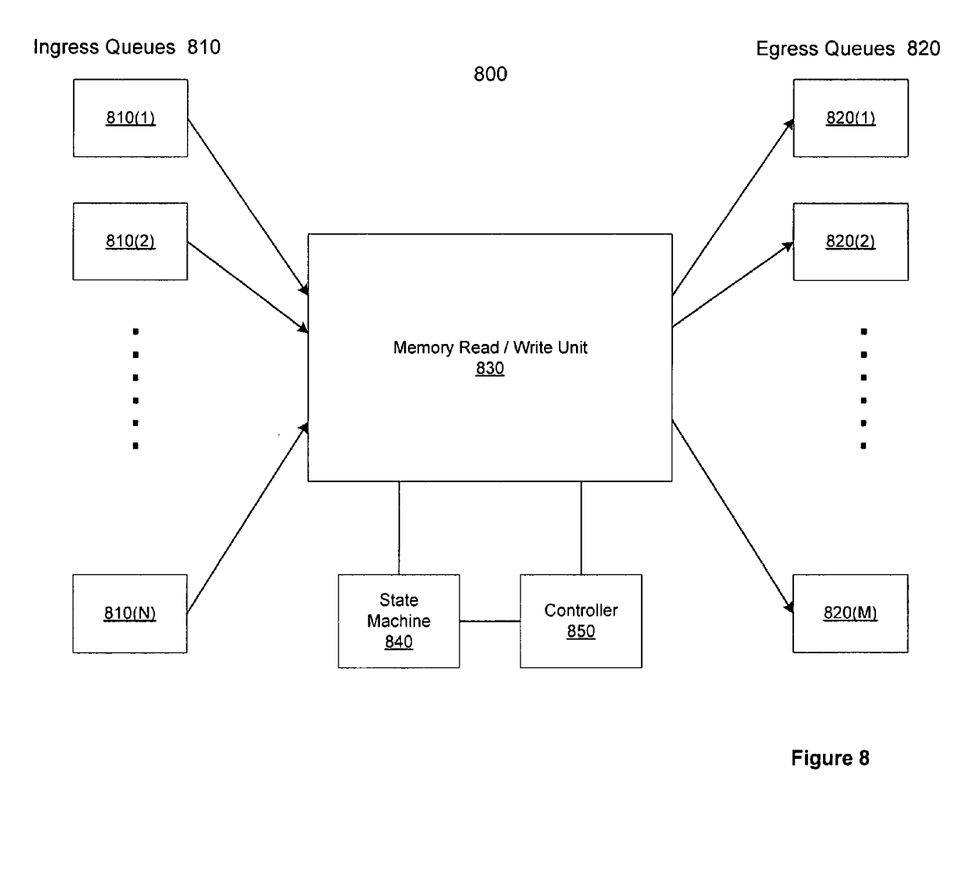
FIG. 8 is a block diagram illustrating components of a transmit module of a transport unit according to one embodiment the present invention.

FIG. 8 illustrates another embodiment of the present invention. As discussed previously, there are a plurality of ingress queues 810 and egress queues 820. Ingress queues are connected to a number (N) of input lines from a local area network and egress queues are connected to frame format units that are ultimately connected via line cards to a number (M) of network links to a remote transport unit connected to another local area network.

A memory read/write unit 830 coupled with a state machine 840 handles a task of reading data from ingress queues and passing that data along to egress queues, wherein the UTP PDUs are formed. The state machine therefore has two general stages: selection of and reading from ingress queues, and selection of and passing data on to egress queues.

The state machine selects an available egress queue to which data will be sent. The state machine first determines the condition of the various line card ports using a desired selection scheme. If an egress queue is available and ready, the state machine selects the egress queue and informs a controller 850. Controller 850 then allocates an amount of memory space for UTP PDU formation in the memory read/write unit. In one embodiment, a memory in which UTP PDU formation takes place is located within the memory read/write unit itself. In another embodiment, a memory for UTP PDU formation may be separate from the memory read/write unit but accessed by the memory read/write unit (i.e., in the egress or ingress queues, or in a separate memory unit). Of the reserved memory space, a certain number of bits can be reserved in the leading portion of the space reserved for the UTP PDU, in order to allow a UTP PDU header to be assembled.

Next, the state machine determines the empty status of the ingress queues with consideration for the priority level of each ingress queue. Different types of input data streams can require different handling (i.e., frame-based versus packet-based data streams) and can also require the prioritizing of one group of inputs over another group. Further, prioritizing of each input port within a type of input ports may be instituted. The state machine determines whether queues are empty and if not, whether these queues are ready to be served based upon their relative priority to other queues that are also not empty.

Once a queue has been selected to for service, the state machine then determines how many bytes remain to be filled in the UTP PDU currently being assembled within the memory read/write unit. All or some of the data in the selected ingress queue is then transferred to the memory read/write unit. The state machine then continues selecting ingress queues based upon a governing selection methodology and moving the input data into the memory read/write unit, until a UTP PDU is filled.

The state machine will then cease gathering input data. At this point, the state machine generates a header that appropriately describes the data contained within a UTP PDU, and inserts that header in reserved leading bits within the memory read/write. A UTP PDU is then transferred out of the memory read/write unit, to a frame formation unit corresponding to the selected egress queue. The state machine then selects another egress queue, and the process is repeated with that egress queue.

Receive Module Example

Figure 9:
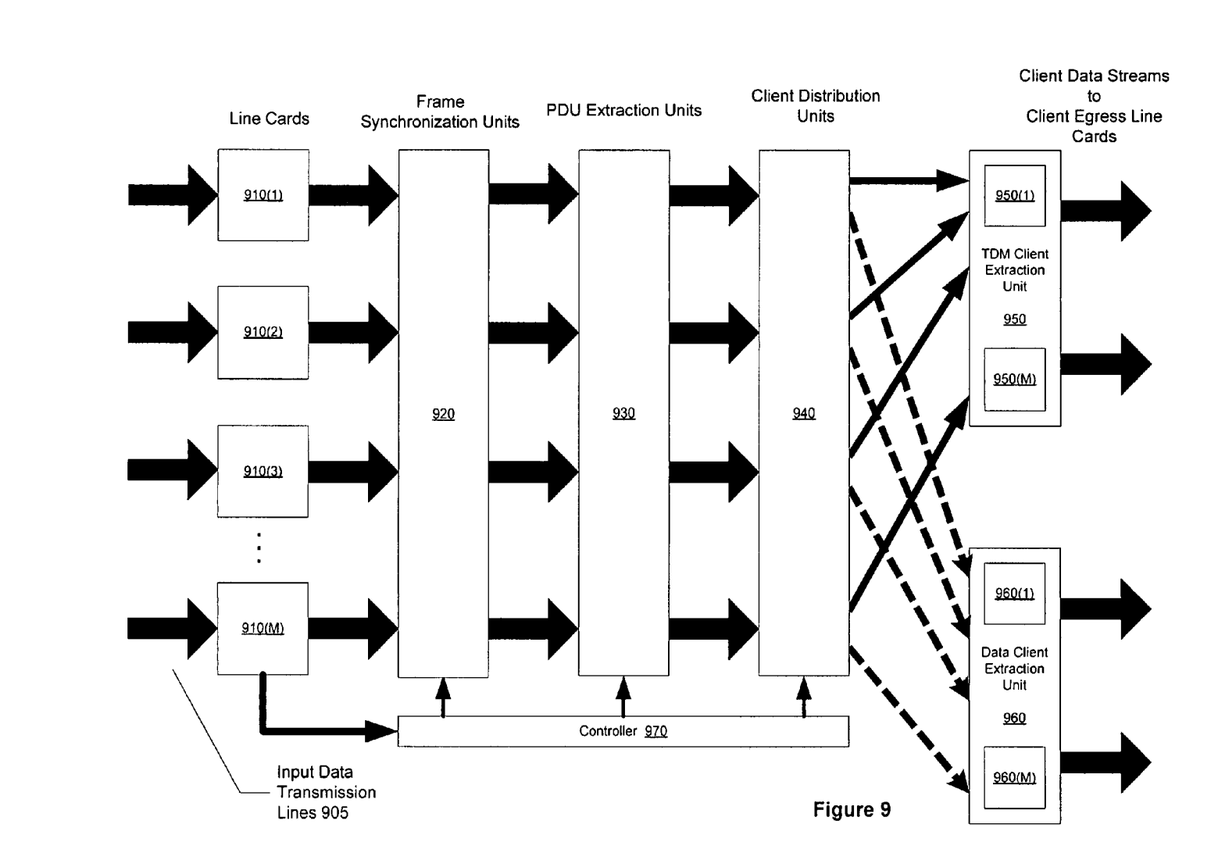
FIG. 9 is a block diagram illustrating components of a receive module of a transport unit according to the present invention.

FIG. 9 illustrates a block diagram of a receive module of the present invention. A group of input data transmission lines 905 are connected to a corresponding group of input line cards 910(1)-(M). Input data transmission lines 905 correspond to output data transmission lines 270 in FIG. 2. Input line cards 910(1)-(M) are responsible for receiving data transmitted by output line cards 260(1)-(M) in FIG. 2.

Each input line card provides received frames to a frame synchronization unit 920. A frame synchronization unit 920 can control the data flow from the input line cards and can ensure that frames are properly aligned prior to sending data to subsequent modules.

Once a complete frame is ready, a PDU extraction unit 930 processes the framed data. The PDU extraction unit can strip a frame header and other frame overhead, and then determines the boundaries of each UTP PDU within a frame's payload.

Extracted UTP PDUs are then processed by a client distribution unit 940. A client distribution unit can read a header of a UTP PDU and determine what type of client information is contained within the UTP PDU (i.e., Ethernet, TDM or both) and distribute data in a UTP PDU payload to an appropriate client data extraction unit (i.e., 950(1)-(M) or 960(1)-(M)). A client distribution unit can further read UTP PDU headers to determine the proper order to send UTP PDUs to the appropriate distribution unit, and combine the data in the UTP PDU payloads prior to sending the data to a client data extraction unit. A client distribution unit can also read a UTP PDU header to determine a destination client egress data line (not shown) upon which the data ultimately must go, and can send that information to the appropriate client data extraction unit.

TDM and Data client data extraction units, 950(1)-(M) and 960(1)-(M) respectively, receive TDM PDUs and extracted data from the client distribution units and send the data to an appropriate client egress line card in the client's native format. The output client data stream is a faithful reproduction of the input data streams 210 to the transmit unit 200.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Moreover, while the invention has been particularly shown and described with reference to these specific embodiments, it will be understood by those skilled in the art that the foregoing and other changes in the form and details may be made therein without departing from the spirit or scope of the invention.

What is claimed is:

1. A transport unit comprising:
   a plurality of first ingress queues, wherein each first ingress queue is configured to receive a TDM datastream;
   a plurality of second ingress queues, wherein each second ingress queue is configured to receive a packetized datastream;
   an ingress queue selector unit coupled to the first ingress queues;
   a payload data unit (PDU) formation unit configured to form a PDU,
   wherein
      the PDU comprises data, wherein
         the data comprises TDM data and packetized data,
         the TDM data is from a TDM datastream, and
         the packetized data is from a packetized datastream, and
      the PDU formation unit comprises a data egress queue to hold a plurality of PDUs, wherein
         the data egress queue is one of a plurality of data egress queues;
   a frame formation unit coupled to the PDU formation unit; and
   an egress queue selector unit coupled to each of
      the second ingress queues,
      the ingress queue selector unit, and
      the data egress queues, wherein
         the ingress queue selector unit transmits the TDM data to the egress queue selector unit.

2. The transport unit of claim 1, wherein
   the frame formation unit is configured to form a frame, and
   the frame comprises one or more PDUs.

3. The transport unit of claim 2 further comprising:
   a plurality of transmission links coupled to the frame formation unit; and
   wherein,
      the frame formation unit is configured to select one of the plurality of transmission links, and
      the frame formation unit is configured to transmit the frame on the selected transmission link.

4. The transport unit of claim 1, wherein
   the ingress queue selector unit selects one of the first ingress queues using a strict-priority round-robin scheduling methodology.

5. The transport unit of claim 1, wherein
   the ingress queue selector unit is configured to
      select one of the first ingress queues,
      form a TDM payload data unit (TDM PDU), and
      transmit data related to the TDM PDU to the egress queue selector unit.

6. The transport unit of claim 5, wherein
   the TDM PDU comprises:
      a TDM PDU header; and
      a payload comprising TDM data from the selected one of first ingress queues.

7. The transport unit of claim 6, wherein
   the TDM data comprises:
      a plurality of Data Signal Level Zero (DS0) timeslots from a T-1 datastream.

8. The transport unit of claim 6, wherein the TDM PDU header comprises:
   a TDM client port identifier;
   a header error correction value; and
   a plurality of frame overhead bits extracted from the TDM data.

9. The transport unit of claim 6, wherein
   the TDM PDU comprises:
      a plurality of DS0 timeslots from a T-1 datastream, wherein
         the plurality of DS0 timeslots from the T-1 datastream are a subset of all of the DS0 timeslots in the T-1 datastream; and
   the TDM PDU header comprises:
      a bit map identifying the plurality of DS0 timeslots from the T-1 datastream present in the TDM PDU.

10. The transport unit of claim 1, wherein
    the egress queue selector unit
       forms a PDU header,
       transmits the PDU header to a selected egress queue,
       controls a transfer of data from the TDM datastream to the selected egress queue, and
       upon a determination that there is available space in the selected egress queue,
          selects one of the second ingress queues, and
          controls a transfer of data from the selected second ingress queue to the selected egress queue.

11. The transport unit of claim 10, wherein the PDU header and data in the selected egress queue comprise a PDU.

12. The transport unit of claim 11, wherein the PDU header comprises:

an identifier of the selected second ingress queue;

an identifier of an amount of data transferred from the TDM datastream to the selected egress queue;

an identifier of the starting location within the PDU of the data transferred from the TDM datastream to the selected egress queue;

an identifier of the amount of data transferred from the selected second ingress queue within the PDU.

13. The transport unit of claim 10, wherein the egress queue selector unit selects an egress queue using a strict round robin scheduling methodology.

* * * * *